United States Patent Office 3,281,102
Patented Oct. 25, 1966

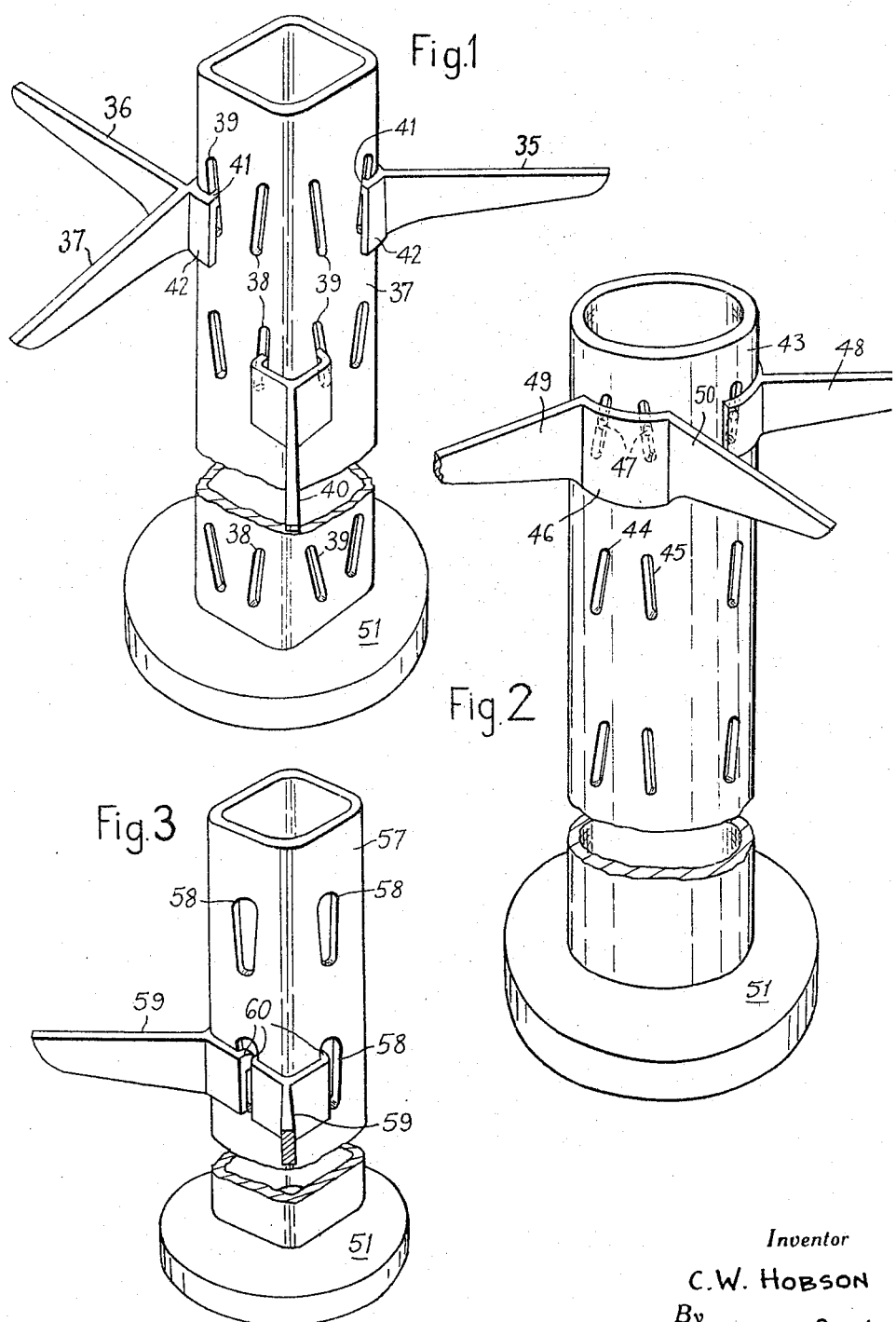

3,281,102
STORAGE OR DISPLAY DEVICES
Charles William Hobson, Tangier, Morocco, assignor to Nancy Hobson, Tangier, Morocco
Original application Aug. 3, 1961, Ser. No. 129,139. Divided and this application Nov. 8, 1965, Ser. No. 506,720
Claims priority, application Great Britain, Aug. 8, 1960, 27,453/60
5 Claims. (Cl. 248—125)

The present invention relates to arrangements for use in supporting brackets, shelves, stands, tables and so on and constitutes a continuation-in-part to my application No. 745,477, filed June 30, 1958, now Patent No. 3,039,622 for Bracket and Shelf Supports, now U.S. Patent No. 3,039,622 and is divided from my co-pending application Serial No. 129,139, now U.S. Patent No. 3,229,648, filed August 3, 1961, for Bracket and Shelf Supports.

According to the parent patent, there is provided an arrangement for use in supporting a bracket, shelf or the like, wherein a support member adapted to carry the bracket, shelf or the like, is removably attached to a substantially upright mounting member, the support member and the mounting member being respectively provided with interengaging members so that the bracket, shelf or the like may be supported at different heights on the mounting member, in which the mounting member includes two internal faces at a substantial angle each to the other, thus constituting a corner member, the support member having two external faces respectively at an angle that corresponds to the angle between the faces of the corner member, said faces of the corner member and of the support member being respectively provided with interfitting projection means and engagement means, one of said means sloping downwardly and inwardly so that the support member is engageable with the corner member so as to wedge the support member in position in the mounting member.

The expression "shelf or the like" is intended to define any flat shelf-like member including a top for a table where appropriate and may also include a framework adapted to support a separate member of sheet material, e.g. wood, metal, plastic or glass.

Preferably, the engagement means comprises an edge or face formed in or on the associated part, and said edge or face may be the edge or face of a slot or channel.

The support members may be integral with the shelf or bracket or may be separate therefrom.

It is an object of the present invention to provide a bracket and shelf support in which the bearer members engage around the outer periphery of a generally upstanding mounting member.

Accordingly, the invention consists of a storage or display device comprising a tubular mounting member and a bracket member for attachment to and detachment from said support member, said bracket member having a bearing part to partially embrace said mounting member, one of said mounting member and said bearing part having a pair of laterally spaced and converging slots or recesses, and the other of said mounting member and said bearing part having two projections for engagement in said slots or recesses, said slots or recesses and said projections thus constituting counterpart engagement means, at least those parts of said slots engageable with said projection being in different planes, pressure on said bearing part acting to wedge said projections into said converging slots to secure said bracket against accidental removal.

Preferably, a plurality of engagement means is provided in said mounting member arranged axially spaced therealong, whereby said bracket may be engaged with said mounting member at any selected one of a number of alternative positions.

The projections may take any desired form, and where this generic term is used in this specification, it may apply to any such form as occasion requires, or as the context demands or admits. For example, a "projection" may be a rib, a rivet or rivet-like member; where ribs are applicable they should be at an angle to the longitudinal axis of the member to correspond to the angle of the engagement means such as a slot, channel or the like, of the other member, to obtain the wedging action referred to herein. Other examples of "projections" are lugs, tongues or studs, to name but a few. Moreover, such projections need not be single entities, they may be compounded from two or more parts. For example, a disc-like head may be welded to a lug to form a composite "projection."

In order that the invention may be more clearly understood reference will now be made to the accompanying drawings which show some embodiments thereof by way of example, and in which:

FIG. 1 shows a perspective view of one embodiment, utilizing a mounting member of rectangular cross-section, FIG. 2 shows a perspective view of a second embodiment, utilizing a mounting member of circular cross-section, and FIG. 3 shows a perspective view of a third embodiment, utilizing a mounting member of rectangular cross-section.

Referring now to the drawings, in the embodiment of FIGURE 1, a mounting member 37 is secured to a base 51 and is of substantially rectangular cross-section with rounded corners and provided with a plurality of pairs of slots 38, 39 the slot 38 of each pair being to one side of the corner of the mounting member and the slot 39 being to the other side of said corner. A pair of slots may be arranged adjacent each corner as shown in the drawing and a plurality of pairs of slots is arranged one above the other along the length of the member at one or more of the corners thereof. Brackets for engagement with the mounting member may have a single arm, as shown at 35, or plural arms, as shown at 36 and 37. The bracket is built with a support member 42, and this support member has, or is formed with projections 41 in the form of tongues formed on the edges of said support member. If desired the support member may be separable from the remainder of the bracket.

Thus, the support member comprises a bearing part which embraces a selected corner of the mounting member 37 in a selected position and thus the mounting member may have a single bracket of any suitable kind engaged thereon, or a number of such brackets if desired, at the same time. The slots 38 and 39 are convergent, being inclined downwardly and outwardly away from the associated corner and thus when the support member 42 of a bracket is engaged around the mounting member and the tongues 41 located in said slots, downward pressure applied to the bracket or the support member thereof will cause the projections securely to wedge in the slots to hold the bracket firmly in position. In fact, within the strength of the materials from which the device is made, the greater the downward pressure, the more secure will be the wedging action because the support member will tend or attempt to move inwardly and downwardly with respect to the selected corner as pressure is applied.

In FIGURE 2, the mounting member 43 is circular in cross-section, although it could be of any other rounded cross-section, for example, elliptical. Similar to the arrangement of FIGURE 1, a plurality of pairs of slots 44, 45, is provided, said slots being convergent, inclining downwardly and outwardly to procure the wedging action in association with projections on the support member of a bracket in a fashion similar to that referred to above in connection with FIGURE 1. A bracket for use on the mounting member 43 of FIGURE 2 comprises a rounded support member 46 having projections 47 thereon and one or more bracket arms may extend from this support member 46 as shown at 48, or 49, 50 respectively. Thus, the or each bracket may be engaged selectively at a desired position. As in the embodiment shown in FIGURE 1, the mounting member may be mounted on a base 51.

Referring to FIGURE 3, a mounting member 57 is of substantially rectangular section and is provided with a plurality of tapering of V-shaped slots or recesses 58 arranged one above the other in rows, and a bracket 59 for use therewith is provided with projections 60 in the form of tongues to enable the brackets to be wedged in position on the corner member by downward pressure on the brackets as explained in connection with the other embodiments. The difference between the arrangements of FIGURES 1 and 3 is that each slot or recess may be used to locate the projecting tongues 60 of different brackets, i.e., the righthand projection of a first bracket and the lefthand projection of a second bracket, although otherwise the support member for the bracket engaegs around the rounded corner of the mounting member as in the arrangement of FIGURE 1. The brackets may have single or plural arms, as referred to in connection with FIGURES 1 and 2.

The mounting member 57 may be arranged on a base 51. Preferably, the mounting members are hollow as shown, i.e. the mounting members are formed from tubes of appropriate cross-section but, if desired, the mounting members may be made solid and the slots for the reception of the various projections be replaced by recesses of suitable depth formed in the thickness of the material.

To assist in the wedging action, the edges of the slots or recesses may be chamfered and the projections may have heads or turned over portions, so that after pressure has been applied, the engaged bracket on the mounting member has the heads engaged behind the chamfered edge of the slots or recesses.

Any suitable materials may be used for making the devices according to the invention. For example the mounting member may be of metal alloy or synthetic plastics material or glass, and the brackets may be of the same or of different materials, chosen e.g. for their strength and appearance.

The mounting members may be in several parts, e.g. those of rectangular or polygonal section may have decorative strips applied in or on the surfaces facing outwards. When the mounting members are wholly or mainly of alloy or plastics, they may be extruded in blank form and the slots or recesses formed afterwards e.g. by punching or milling. They may be of any desired length.

Moreover, the mounting members need not have simple shapes in cross-section but could, for example, be formed of a composite, straight and rounded shape based on the general shape of a rectangle or polygon with the corners considerably enlarged with a rounded shape projecting away from the main part or, alternatively, they could be formed of a plurality of rounded portions or flutes joined together along their longitudinal edges into a closed figure. In such embodiments, the support members for the brackets would be of curved shape to suit the rounded or fluted portions, the latter being provided with the convergent slots or recesses and the support members being provided with the projections. Such composite shapes could conveniently be formed by extrusion.

I claim:

1. A storage or display device comprising a tubular mounting member and a bracket member for attachment to and detachment from said mounting member, said bracket member having a bearing part to partially embrace said mounting member, one of said mounting member and said bearing part having a pair of laterally spaced and converging slots or recesses, and the other of said mounting member and said bearing part having two projections for engagement in said slots or recesses, said slots or recesses and said projections thus constituting counterpart engagement means, at least those parts of said slots engageable with said projection being in different planes, pressure on said bearing part acting to wedge said projections into said converging slots to secure said bracket against accidental removal.

2. A device according to claim 1 wherein said mounting member has a plurality of pairs of said engagement means arranged axially spaced therealong whereby said bracket may be engaged with said mounting member at any selected one of a number of alternative positions.

3. A device according to claim 2, wherein said mounting member is mounted to stand substantially upright and bears a plurality of pairs of laterally spaced and converging slots, said bracket member having a bearing part defining two projections for engagement selectively in one of said pairs of slots.

4. A device according to claim 3, wherein said mounting member is of polygonal cross section and wherein the two slots of a pair of said slots are respectively formed in the adjacent faces of said polygonal cross section.

5. A device according to claim 3, wherein said mounting member is of rounded cross section and wherein said bearing part has a curved face to embrace part of said rounded cross section.

References Cited by the Examiner

UNITED STATES PATENTS

| | | | |
|---|---|---|---|
| 2,103,106 | 12/1937 | Yurkovitch | 248—224 |
| 2,872,144 | 2/1959 | Hobson | 248—223 |
| 2,937,767 | 5/1960 | Butler et al. | 211—148 |
| 3,212,648 | 10/1965 | Baker et al. | 211—177 |

CLAUDE A. LE ROY, *Primary Examiner.*

J. F. FOSS, *Assistant Examiner.*